March 18, 1947.　　B. T. FIELDER　　2,417,475
FOOD CUTTER AND PEELER
Filed March 20, 1945　　2 Sheets-Sheet 1
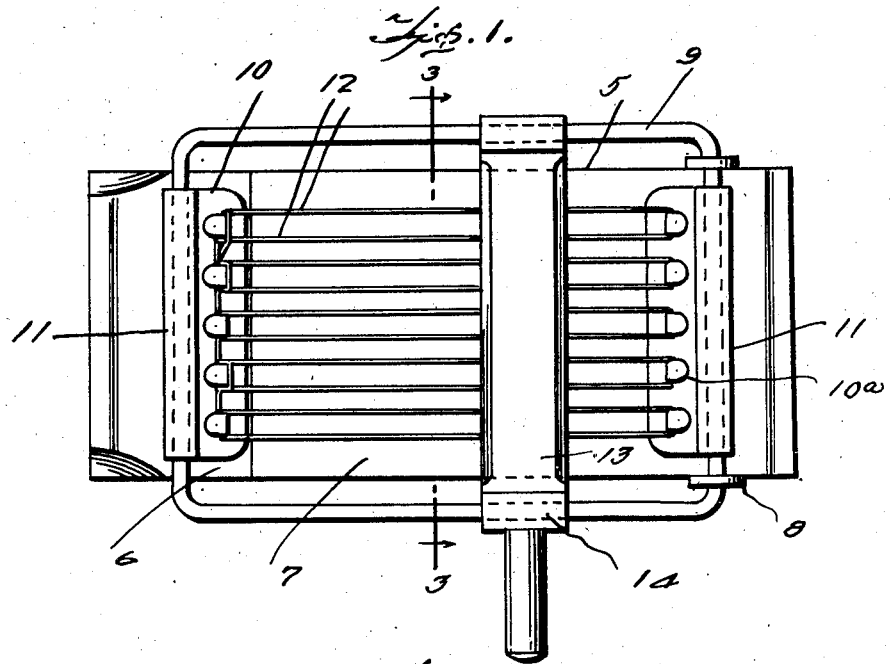
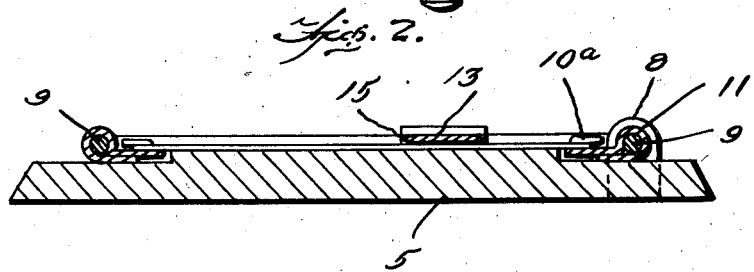
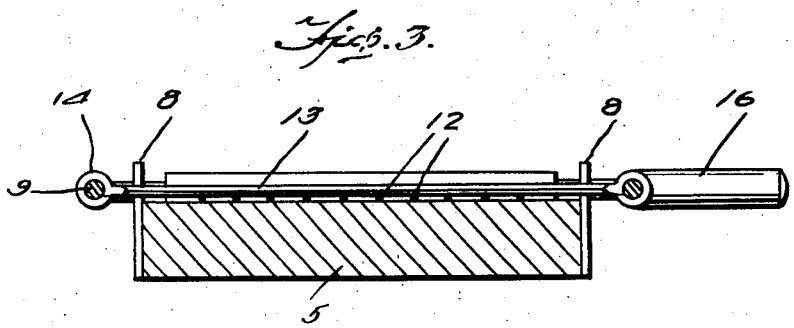
INVENTOR.
Bessie T. Fielder
ATTORNEYS March 18, 1947.  B. T. FIELDER  2,417,475
FOOD CUTTER AND PEELER
Filed March 20, 1945  2 Sheets-Sheet 2
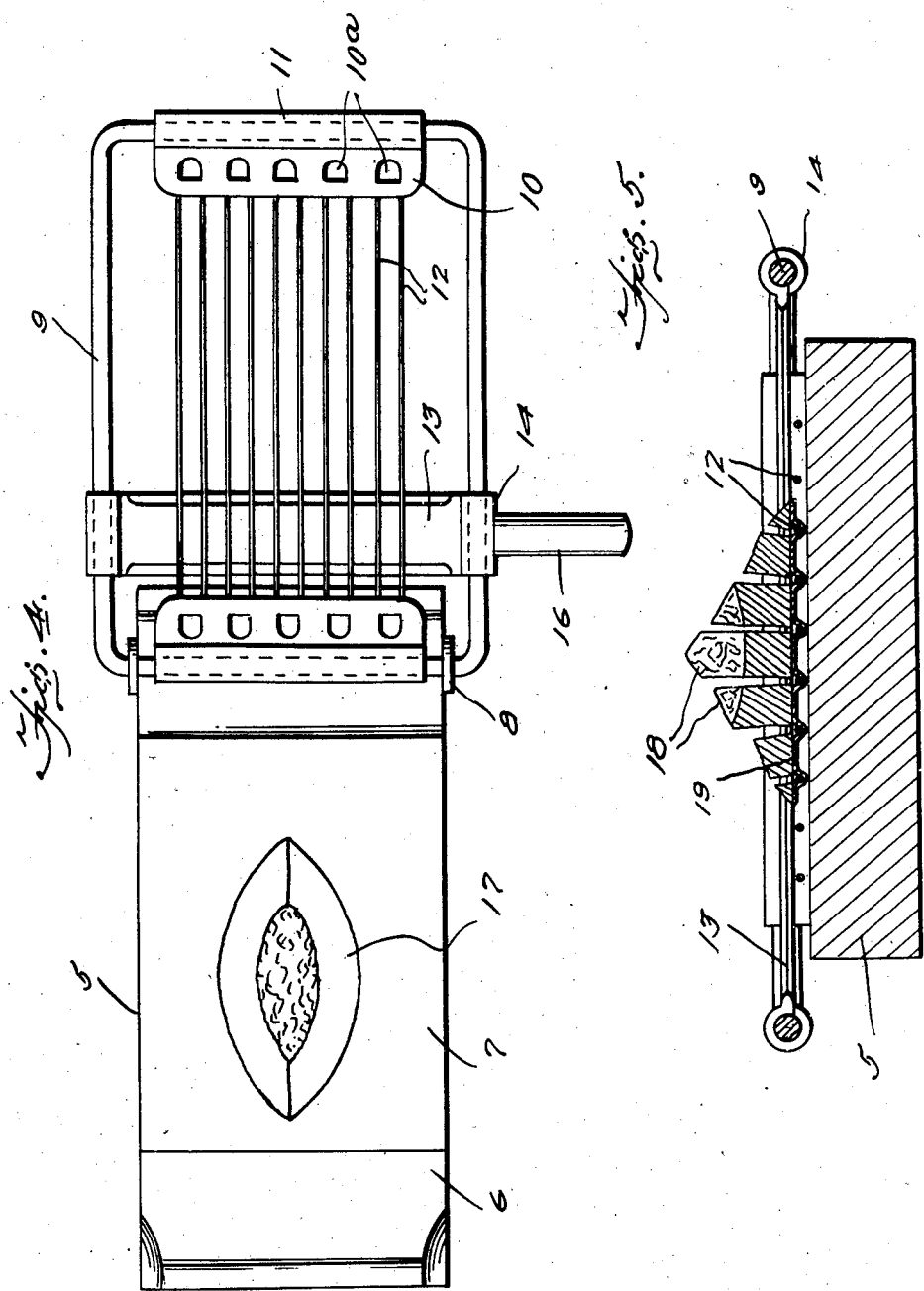
INVENTOR.
Bessie T. Fielder
BY
ATTORNEYS Patented Mar. 18, 1947

2,417,475

UNITED STATES PATENT OFFICE 2,417,475

FOOD CUTTER AND PEELER

Bessie T. Fielder, Towson, Md.

Application March 20, 1945, Serial No. 583,739

9 Claims. (Cl. 146—37)

The present invention relates to new and useful improvements in food slicing and peeling device, and more particularly to a hand-operated tool of this character.

An important object of the present invention is to provide a device embodying means for cutting a segment of a peach, for example, in slices and also for cutting the skin from the slices.

More specifically, the invention embodies a base having a flat surface on which a segment of a peach is placed together with a vertically swingable frame pivoted at one end of the base and having a plurality of spaced-apart wire cutters carried thereby for slicing the segments of the peach by forcing the cutters downwardly therethrough and also providing a cutter slidably mounted on the frame and adapted for movement horizontally immediately above the surface of the base to sever the skin from the slices.

A further object of the invention is to provide a double-edged blade slidably mounted on the frame for severing the skin from the slices upon a sliding movement of the blade in either direction.

A still further object of the invention is to provide a device of this character in which the wire cutters for slicing the peach are also utilized for holding the skin to which the slices adhere flatly against the base in a position for severing the slices closely to the skin.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a top plan view showing the cutting frame in closed position on the base, Figure 2 is a longitudinally sectional view of the device shown in Figure 1, Figure 3 is a transverse sectional view taken substantially on a line 3—3 of Figure 1, Figure 4 is a plan view showing the cutting frame in open position, and Figure 5 is a transverse sectional view showing a segment of a peach after being cut into slices, ready for peeling.

Referring now to the drawings in detail, wherein for the purpose of illustration I have disclosed a preferred embodiment of the invention, the numeral 5 designates a base of substantially rectangular form and which may be constructed of wood or other suitable material.

The ends of the base are reduced in thickness, as indicated at 6, to provide a raised central platform 7 on the base.

A pair of upstanding ears 8 are secured to the opposite sides of the base at one of the reduced ends thereof and in which one end of a substantially rectangular-shaped frame 9 is pivotally mounted for swinging vertically into and out of position on top of the base. The frame 9 is of rod material and to each end of the frame is secured a plate 10 having its intermediate portion rolled to form a tube 11 in which the end of the frame is received.

The edges of the plate 10 at the respective ends of the frame project inwardly toward each other and are provided with tongues 10a struck upwardly therefrom with the free ends of the tongues extending outwardly and around which are extended endless wire cutters 12 arranged in spaced parallel relation and extending longitudinally of the frame.

A blade 13 is formed with tubes 14 at each end thereof slidably mounted on the sides of the frame 9, the blade extending transversely of the frame and is formed at each edge with a sharpened cutting edge 15. A handle 16 projects laterally from one end of the blade 13.

The blade 13 is positioned on top of the wire cutters 12 when the frame 9 is swung downwardly upon the base 5, as indicated in Figures 2 and 3 of the drawings.

In the operation of the device, a peach is cut to form quarter segments 17 from which the seed or stone is removed and a segment is then placed on the raised portion 7 of the base with the skin of the peach lowermost.

The frame is then swung from the open position shown in Figure 4 to its closed position, as shown in Figure 1, whereby the wire cutters 12 will cut through the pulp of the peach to form the segment into slices 18, as indicated in Figure 5 of the drawings.

The wire cutters 12 cut through the pulp of the peach to the skin 19 thereof and the handle 16 of the blade 13 is then moved longitudinally of the sides of the frame 9 immediately above the skin 19 to sever the slices 18 therefrom.

The cutter 13 may be positioned at either end of the frame 9 when the latter is swung downwardly to cut the slices 18 by the wire cutters 12 and the cutter 13 then moves toward an opposite end of the frame so that either of its cutting edges may be used for severing the skin from the slices of the peach.

While I have illustrated and described the invention as adapted for use in slicing and peeling peaches, it will be apparent that the device may also be used for other types of fruit.

In view of the foregoing description taken in conjunction with the accompanying drawings, it is believed that a clear understanding of the construction, operation and advantages of a tool of this character will be quite apparent to those skilled in the art. A more detailed description thereof is accordingly deemed unnecessary.

It is to be understood, however, that even though I have herein shown and described a preferred embodiment of my invention, the same is susceptible to certain changes fully comprehended by the spirit of the invention as herein described, and the scope of the appended claims.

It will also be understood that the several parts of the device may be constructed of any suitable material capable of carrying out the intended purposes of the invention.

Having thus described the invention, what I claim is:

1. A food-slicing and skin-removing device comprising a substantially flat base on which a segment of the food is adapted to be placed, a frame mounted on said base for swinging movement towards and away from said base, a plurality of spaced cutters carried by the frame and adapted upon a movement of the frame towards the base to cut the pulp of the food substantially to the skin thereof, and a blade slidably mounted on the frame behind the cutters adapted to pass through the pulp of the food close to the skin thereof to sever the pulp from the skin thereof.

2. A food-slicing and skin-removing device comprising a base on which a segment of the food is adapted to be placed, a frame mounted on said base for swinging movement towards and away from said base at one end of the base, a plurality of relatively thin spaced cutters carried by the frame and adapted upon a movement of the frame towards the base to cut the pulp of the food exclusive of the skin into slices, and a blade slidably mounted on the frame closely above said cutters and adapted to pass horizontally through the pulp of the food adjacent the skin thereof.

3. A fruit-slicing and skin-removing device of the class described comprising a base having a substantially flat surface on which a segment of the fruit is adapted to be placed, a frame mounted for vertical swinging movement on said base, a plurality of spaced cutters carried by the frame and adapted upon a movement of the frame downwardly onto the base to cut the pulp of the fruit into slices, and a double-edged blade slidably mounted on the frame and adapted to cut horizontally through the pulp in either direction to sever the skin of the fruit from the pulp.

4. A food slicer and peeler comprising a frame, means for mounting said frame for movement to and from a base, a plurality of substantially coplanar cutting elements adapted to penetrate the food exclusive of its peel supported in said frame and movable therewith to bear upon said base through said peel when the frame is positioned proximate to said base, and a cutting element mounted on said frame for movement in a path immediately adjacent to the upper portions of the first said cutting elements, so as to remove said peel with a minimum of the food.

5. A food slicer and peeler comprising a frame, means for mounting said frame for movement to and from a base, a plurality of substantially coplanar parallel cutting elements adapted to penetrate the food exclusive of its peel supported in said frame and movable therewith to bear upon said base through said peel when the frame is positioned proximate to said base, and a cutting element mounted on said frame for movement in a path immediately adjacent to the upper portions of and substantially parallel to the first cutting elements, so as to remove said peel with a minimum of the food.

6. A food slicer and peeler comprising a frame, pivotal means for mounting said frame for movement to and from a base, a plurality of substantially coplanar cutting elements adapted to penetrate the food exclusive of its peel supported in said frame and movable therewith to bear upon said base through said peel when the frame is positioned proximate to said base, and a cutting element mounted on said frame for movement in a plane immediately adjacent to the upper portions of the first said cutting elements, so as to remove said peel with a minimum of the food.

7. A fruit-slicing and skin-removing device of the class described comprising a base having a substantially flat surface upon which a segment of fruit is adapted to be placed, a cutter frame, means pivotally mounting the frame on the base for vertical swinging movement of the frame towards and away from said base, a plurality of spaced parallel wire cutters extending longitudinally of the frame and adapted to pass through the pulp of the fruit upon a downward movement of the frame towards the base to sever the fruit into slices and press the skin against the base, and a knife blade extending transversely of the frame and slidably mounted with respect to said frame, said knife blade being adapted for movement horizontally through the pulp adjacent the skin of the fruit while the skin is pressed against the base to sever the skin therefrom.

8. A fruit-slicer and skin-remover comprising a base on which a segment of the fruit is adapted to be placed, a cutting frame pivoted to said base for vertical swinging movement downwardly toward the base, a pair of plates constituting a portion of the frame, a plurality of projections formed on said plates, wire cutters attached to the projections and extending in substantially parallel relationship to one another longitudinally of the frame and adapted to sever the pulp of the fruit into slices and press the skin against the base, and a cutter slidably mounted with respect to said frame and adapted for movement horizontally closely above the wire cutters while the skin is pressed against the base to sever the skin of the fruit from the pulp.

9. A fruit-slicer and skin-remover comprising a base having a substantially flat surface on which a segment of the fruit is adapted to be placed, a cutting frame pivoted at one end near one end of the base for vertical swinging movement downwardly on the base, a pair of plates attached to the ends of the frame, tongues struck from the plates, wire cutters attached to the tongues and extending in parallel relationship to one another longitudinally of the frame and adapted to sever the pulp of the fruit into slices, said wire cutters pressing the skin of the fruit upon the base when positioned proximate thereto, and a knife blade slidably mounted at the sides of the frame and adapted for movement horizontally and closely above the wire cutters while the skin is pressed upon the base to sever the skin from the pulp.

BESSIE T. FIELDER.

REFERENCES CITED

The following references are of record in the file of this patent:

UNITED STATES PATENTS

| Number | Name | Date |
|---|---|---|
| 1,143,135 | Rathbun | June 15, 1915 |
| 168,033 | Lohr | Sept. 21, 1875 |
| 1,370,634 | Dowson | Mar. 8, 1921 |
| 682,722 | Lindenberg et al. | Sept. 17, 1901 |
| 1,522,088 | Ungerman | Jan. 6, 1925 |
| 2,240,221 | Locker | Apr. 29, 1941 |
| 1,808,933 | Pahlow | June 9, 1931 |
| 1,705,257 | Locket | Sept. 19, 1927 |

FOREIGN PATENTS

| Number | Country | Date |
|---|---|---|
| 84,393 | Swiss | Mar. 16, 1920 |
| 110,682 | German | May 16, 1900 |
| 508,808 | French | Jan. 21, 1920 |